(12) United States Patent
Psota et al.

(10) Patent No.: US 10,796,142 B2
(45) Date of Patent: Oct. 6, 2020

(54) SYSTEMS FOR TRACKING INDIVIDUAL ANIMALS IN A GROUP-HOUSED ENVIRONMENT

(71) Applicant: NUtech Ventures, Lincoln, NE (US)

(72) Inventors: Eric T. Psota, Lincoln, NE (US); Lance C. Perez, Lincoln, NE (US); Mateusz Mittek, Lincoln, NE (US); Ty Schmidt, Eagle, NE (US)

(73) Assignee: NUtech Ventures, Lincoln, NE (US)

( * ) Notice: Subject to any disclaimer, the term of this patent is extended or adjusted under 35 U.S.C. 154(b) by 100 days.

(21) Appl. No.: 16/114,565

(22) Filed: Aug. 28, 2018

(65) Prior Publication Data

US 2019/0138801 A1 May 9, 2019

Related U.S. Application Data

(60) Provisional application No. 62/551,100, filed on Aug. 28, 2017.

(51) Int. Cl.
*G06K 9/00* (2006.01)
*G06T 7/246* (2017.01)
(Continued)

(52) U.S. Cl.
CPC ........ *G06K 9/00369* (2013.01); *A01K 1/0209* (2013.01); *A01K 1/031* (2013.01);
(Continued)

(58) Field of Classification Search
CPC ........... G06K 9/00369; G06K 9/00342; G06K 9/00771; A01K 29/005; A01K 1/031;
(Continued)

(56) References Cited

U.S. PATENT DOCUMENTS

| 10,249,054 | B2 * | 4/2019 | Amat Roldan | ...... G01B 21/042 |
| 2004/0245477 | A1 * | 12/2004 | Matsuda | ............. A01K 29/005 |
| | | | | 250/458.1 |

(Continued)

OTHER PUBLICATIONS

Ahrendt et al., "Development of a real-time computer vision system for tracking loose-housed pigs," Comp. Electr. Agric., 2011, 76:169-74.

(Continued)

*Primary Examiner* — Bobbak Safaipour
(74) *Attorney, Agent, or Firm* — Fish & Richardson P.C.

(57) ABSTRACT

Implementations directed to providing a computer-implemented method comprising receiving, from a motion sensing device, a plurality of image frames that includes information regarding a plurality of animals housed in a group-housed environment, determining a coordinate space of the group-housed environment based on an analysis of a first image frame of the image frames, generating, based on the analysis of the first image frame, an ellipsoid model for each animal based on defined surface points for each animal weighted according to a likely proximity to a crest of a spine of the respective animal, and tracking a position and an orientation of each animal within the image frames by enforcing shape consistency of the ellipsoid models, and adjusting the position of each of the ellipsoid models based on the defined surface points for each animal and a maximum likelihood formulation of a movement distance for each animal.

24 Claims, 11 Drawing Sheets

(51) Int. Cl.
G06T 7/60 (2017.01)
G06T 7/73 (2017.01)
A01K 29/00 (2006.01)
A01K 1/02 (2006.01)
A01K 1/03 (2006.01)

(52) U.S. Cl.
CPC ........ *A01K 29/005* (2013.01); *G06K 9/00342* (2013.01); *G06T 7/246* (2017.01); *G06T 7/60* (2013.01); *G06T 7/73* (2017.01); *G06T 2207/10016* (2013.01); *G06T 2207/10028* (2013.01); *G06T 2207/20101* (2013.01)

(58) Field of Classification Search
CPC ........... A01K 1/0209; G06T 7/73; G06T 7/60; G06T 7/246; G06T 2207/20101; G06T 2207/10016; G06T 2207/10028; G06T 7/277; G06T 2207/30232; G06T 2207/30172; G06T 2207/20104; G06T 2207/20081; G06T 2207/20076
See application file for complete search history.

(56) References Cited

U.S. PATENT DOCUMENTS

| | | | | |
|---|---|---|---|---|
| 2013/0064432 | A1* | 3/2013 | Banhazi | A01K 29/00 382/110 |
| 2015/0077543 | A1* | 3/2015 | Kerr | H04N 5/2256 348/135 |
| 2017/0083748 | A1* | 3/2017 | Zhou | G06K 9/4671 |
| 2018/0268557 | A1* | 9/2018 | Watanabe | G06T 7/248 |
| 2019/0087965 | A1* | 3/2019 | Datta | G06T 7/251 |
| 2019/0223406 | A1* | 7/2019 | Brayer | A01J 9/00 |

OTHER PUBLICATIONS

Giancardo et al., "Automatic Visual Tracking and Social Behaviour Analysis with Multiple Mice," PLoS One, 2013, 8:e74557.

Kashiha et al., "Automatic identification of marked pigs in a pen using image pattern recognition," Comp. Elect, In Agric., 2013, 93:111-20.

Kashiha et al., "Automatic Monitoring of Pig Locomotion Using Image Analysis," Livestock Sci., 2014, 159:141-8.

Krizhevsky et al., In Advances in Neural Information Processing Systems, 2012, 1097-1105.

Mittek et al., "Health Monitoring of Group-Housed Pigs using Depth-Enabled Multi-Object Tracking," In Visual Observation and Analysis of Vertebrate and Insect Behavior, 2016, 4 pages.

Nasirahmadi et al., "Implementation of machine vision for detecting behaviour of cattle and pigs," Livestock Sci, 2017, 202:25-38.

Nasirahmadi et al., "Using machine vision for investigation of changes in pig group lying patterns," Comp. Elect, Computers and Electronics in Agriculture, 2015, 119:184-90.

Sadafi et al., "Multiple Mice Tracking and Segmentation through SIFT Flow Analysis," In Vis. Observ. Analy. Vertebrate and Insect Behavior, 2016, 4 pages.

Song and Xiao, "Tracking Revisited using RGBD Camera: Unified Benchmark and Baselines," In Proc. IEEE Inter. Conf. Comp. Vision, 2013, 233-40.

Bishop & Welch, "An Introduction to the Kalman Filter," Proc. of SIGGRAPH, 2001, Course, 8:41.

Brown & Meyer, "The Fundamental Theorem of Exponential Smoothing," Operations Res., 1961, 9:673-85.

Fischler & Bolles, "Random sample consensus: a paradigm for model fitting with applications to image analysis and automated cartography," Commun. ACM, 1981, 24:381-95.

Gao et al., "Complete solution classification for the perspective-three-point problem," IEEE Transactions on Pattern Analysis and Machine Intelligence, 2003, 25:930-43.

Moon, "The expectation-maximization algorithm ," IEEE Signal Proc. Magazine, 1996, 13:47-60.

Ren et al., "Faster R-CNN: Towards Real-Time Object Detection with Region Proposal Networks," Advances in neural information processing systems, 2015, 91-99.

* cited by examiner

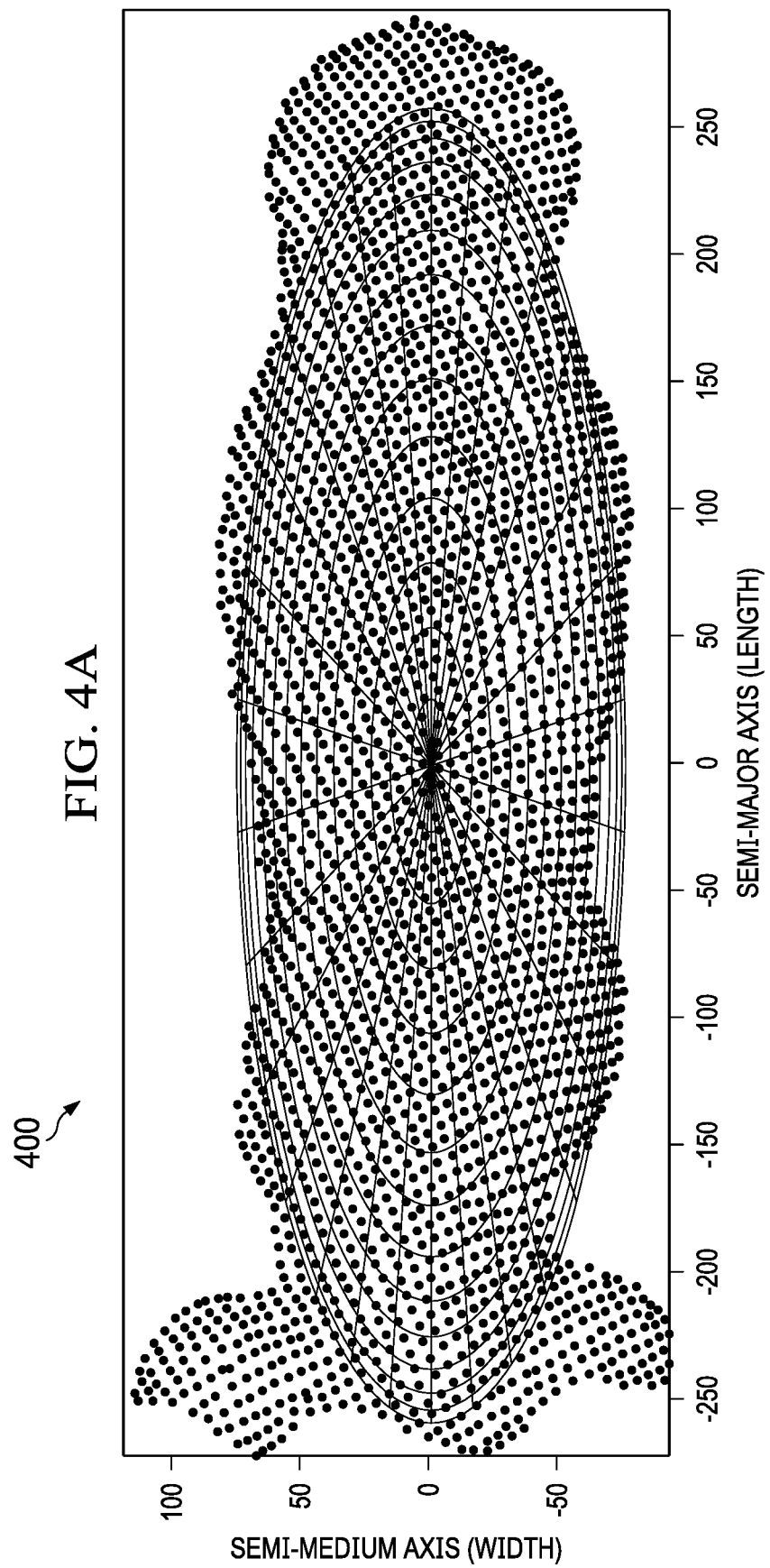

SYSTEMS FOR TRACKING INDIVIDUAL ANIMALS IN A GROUP-HOUSED ENVIRONMENT

CROSS-REFERENCE TO RELATED APPLICATIONS

This application claims the benefits of U.S. Provisional Application Ser. No. 62/551,100, filed Aug. 28, 2017. The disclosure of the prior application is considered part of (and is incorporated by reference in) the disclosure of this application.

TECHNICAL FIELD

This disclosure generally relates to systems of monitoring and evaluating animal health.

BACKGROUND

Precision livestock farming (PLF) is an engineering approach to livestock management using continuous, automated, long-term activity monitoring of individual livestock. Such a system provides high-resolution data about individual animals that can be used for behavioral classification, weight estimation, and disease control; this has widespread appeal for both researchers and producers.

While it is possible to measure feed and water consumption, facility temperature, and other external parameters of suspected importance to PLF systems, the core component of the system—the animal—is often difficult to measure, and researchers have introduced a variety of methods and technologies for monitoring the activities of animals. Early work in PLF systems include ambient sensors to measure sound and air quality, as well as those that measure livestock inputs through feed and water consumption. Wearable devices affixed to the animal have also been designed to measure movement, orientation, oxygen saturation, and body temperature. By including inertial measurement units, these wearable devices can be combined with modern machine learning techniques to classify common behaviors (feeding, rooting, walking, lying laterally, and lying sternally) at 75% or better. While encouraging results from these systems have proven their usefulness for more than a decade, they are rarely used outside of the research community; key drawbacks to tag-based systems, such as battery life, size, cost, durability, and wireless constraints, limit their practicality for widespread adoption.

Researchers also have explored ways to apply computer vision tracking systems to PLF, including systems to characterize gait analysis and behavior during pregnancy. When applied to group-housed animals, video tracking research has generally split into two categories: those who treat the group of animals as a collective, and those who treat the group of animals as individuals. Those who focus on analyzing the collective group can determine properties such as average growth rate, and even detect specific instances of behavior, such as aggression. However, these systems do not attempt to track individual animals, so they are incapable of parameterizing variations in behavior and well-being in group-housed environments.

There exists a need for multi-object tracking systems that allow long-term and continuous tracking (e.g., by assuming objects regularly enter and exit the video frame), and that do not require dissimilarity among the objects.

SUMMARY

Implementations of the present disclosure are generally directed to tracking multiple targets in a group-housed environment. More specifically, implementations are directed to tracking the position and orientation of animals housed in a group-housed environment through images received from a motion sensing device.

In some implementations, actions include receiving, from a motion sensing device, a plurality of image frames that includes information regarding a plurality of animals housed in a group-housed environment, determining a coordinate space of the group-housed environment based on an analysis of a first image frame of the image frames, generating, based on the analysis of the first image frame, an ellipsoid model for each animal based on defined surface points for each animal weighted according to a likely proximity to a crest of a spine of the respective animal, and tracking a position and an orientation of each animal within the image frames by enforcing shape consistency of the ellipsoid models, and adjusting the position of each of the ellipsoid models based on the defined surface points for each animal and a maximum likelihood formulation of a movement distance for each animal. In some implementations, actions include providing the tracking the position and the orientation data to a livestock management system that tracks health, well-being, growth-rate, and aggression among the animals in the group-housed environment. Other implementations of this aspect include corresponding systems, apparatus, and computer programs, configured to perform the actions of the methods, encoded on computer storage devices.

These and other implementations can each optionally include one or more of the following features: the maximum likelihood formulation alternates between assigning maximum-likelihood clusters to the defined surface points for each animal via a metric that enforces an ellipsoidal distribution, and a recalculation of parameters of the maximum-likelihood clusters; tracking the position and the orientation of each animal includes the use of an adaptive formulation of an exponential smoothing tracker; determining the coordinate space of the group-housed environment is based on annotating corner points of the group-housed environment in the first image frame; annotating the corner points of the group-housed environment is performed via a user interface; the first image frame is further annotated to isolate points in a foreground of the first image from a background of the first image by removing points that lie outside the group-housed environment bounds and masking out points that lie in the image space of a feeder and a waterer; the position and the orientation of each animal is characterized by a centroid and rotation matrix applied to each respective ellipsoid model, adjusting the position of each of the ellipsoid models within each image frame is based on recalculating a centroid and an orientation of each respective ellipsoid model by weighting the respective surface points according to a likely proximity to the crest of the spine of the respective animal; and the animals are pigs.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

Unless otherwise defined, all technical and scientific terms used herein have the same meaning as commonly understood by one of ordinary skill in the art to which the methods and compositions of matter belong. Although methods and materials similar or equivalent to those described herein can be used in the practice or testing of the methods and compositions of matter, suitable methods and materials are described below. In addition, the materials, methods, and examples are illustrative only and not intended to be limiting. All publications, patent applications, patents, and other references mentioned herein are incorporated by reference in their entirety.

DESCRIPTION OF DRAWINGS

FIGS. 4A-4C depicts a top, a front, and a side view, respectively, of a centered and orientation-corrected point cloud representing spine/back points along with a fixed-size ellipsoid fit to the points.

DETAILED DESCRIPTION

In accordance with the present invention, there may be employed conventional molecular biology, microbiology, biochemical, and recombinant DNA techniques within the skill of the art. Such techniques are explained fully in the literature. The invention will be further described in the following examples, which do not limit the scope of the systems, methods, and compositions of matter described in the claims.

Implementations of the present disclosure are generally directed to a multi-object tracking system to track multiple targets in a group-housed environment. More specifically, implementations are directed to tracking the position and orientation of animals housed in a group-housed environment through images received from a motion sensing device. The below examples and figures describe an example context involving pigs in an enclosed pin; however, any sort of grouping(s) of targets may be tracked in a space (enclosed or otherwise sectioned) with the described multi-object tracking system.

EXAMPLE 1—SUMMARY OF METHODS

Figure 1:
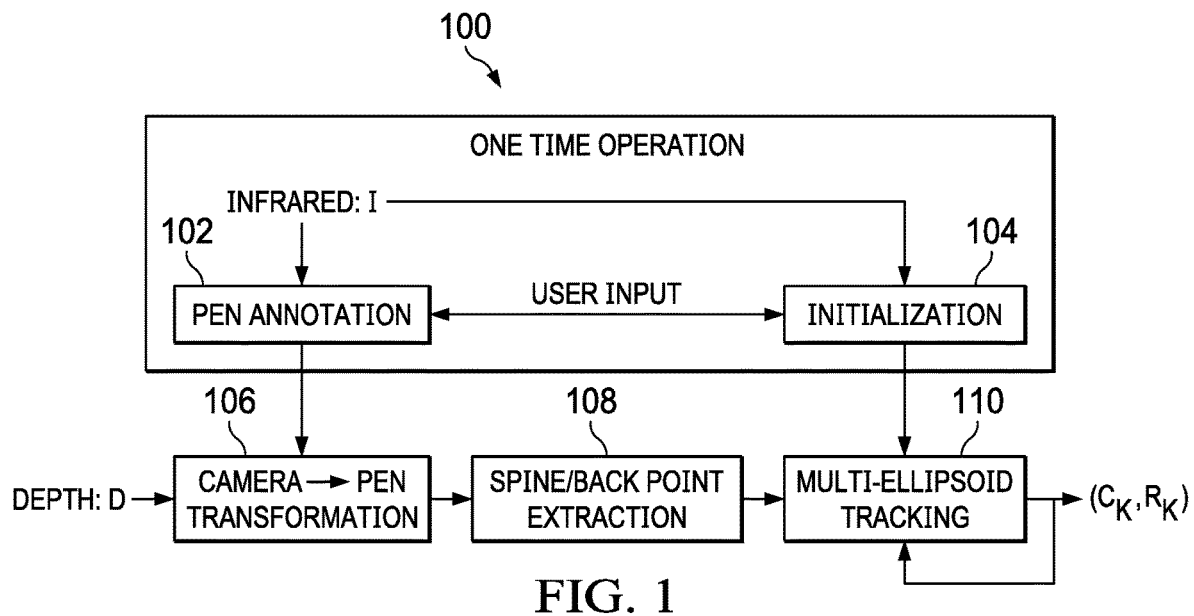
FIG. 1 depicts a flow diagram of an example process flow employed within the described multi-object tracking system.

FIG. 1 depicts a flow diagram of an example process 100 for to tracking multiple targets in an environment. For clarity of presentation, the description that follows generally describes the process 100 in the context of FIGS. 2A-9. However, it will be understood that the process 100 may be performed, for example, by any other suitable system, environment, software, and hardware, or a combination of systems, environments, software, and hardware as appropriate. In some implementations, various operations of the process 100 can be run in parallel, in combination, in loops, or in any order.

In some implementation, the process 100 may employ depth images to track multiple targets in a group-housed environment. The process 100 advances upon work of Mittek et al. (2016, *In Visual observation and analysis of Vertebrate and Insect Behavior* 2016, pp 9-12) by using Expectation Maximization (EM) over a set of weighted points and introducing an adaptive formulation of exponential smoothing that handles occlusions. In some implementations, a user may annotate the pen as the motion sensing input device may not move with respect to the pen environment. Before tracking begins, the positions of the animals can be initialized 104 by the user. Details regarding the processing stages are provided herein.

In some implementations, after one-time user initialization 104, a series of operations are performed on the depth data to estimate the three-dimensional (3D) position $C_k^t$ and 3D orientation $R_k^t$ of each pig $k \in \{1, \ldots, K\}$ in a pen at time t. Given the information provided to the tracking system and assuming a uniform distribution of positions and orientations, the maximum likelihood estimate of the current state at time t is:

$$\{C_k^t, R_k^t\} = \underset{C_k^t, R_k^t}{\mathrm{argmax}} P(C_k^t, R_k^t \mid C_{1,\ldots,k}^0, R_{1,\ldots,k}^0, P^0, P^1, \ldots, P^t) \quad (1)$$

$$\forall k = 1, \ldots, K,$$

where $\{C_{1,\ldots,k}^0, R_{1,\ldots,k}^0\}$ are the initialized positions and orientations of each pig and $\{P^0, P^1, \ldots, P^t\}$ are the set of all measured 3D points up to and including time t. A more efficient iterative solution can be approximated by assuming that the previous estimates $\{C_{1,\ldots,k}^{t-1}, R_{1,\ldots,k}^{t-1}\}$ are correct and that the state estimates and observations can be modelled as a Markov process, i.e., $$P(C_k^t, R_k^t \mid C_{1,\ldots,k}^0, R_{1,\ldots,k}^0, P^0, P^1, \ldots, P^t) \approx P(C_k^t, R_k^t \mid C_{1,\ldots,k}^0, R_{1,\ldots,k}^0). \quad (2)$$

The proposed method may employ EM to iteratively approximate the solution to (1) using the Markov process assumption of (2). Examples 2 and 3 provide a method for obtaining the 3D point sets $\{P^0, P^1, \ldots, P^t\}$ through background subtraction and geometric alignment. The methods in Examples 4 and 5 are used to approximate the probability given in (2) by assuming that the distribution of points belonging to each object roughly conforms to a fixed-sized ellipsoid.

EXAMPLE 2—MANUAL ANNOTATION 102

Figure 2A:
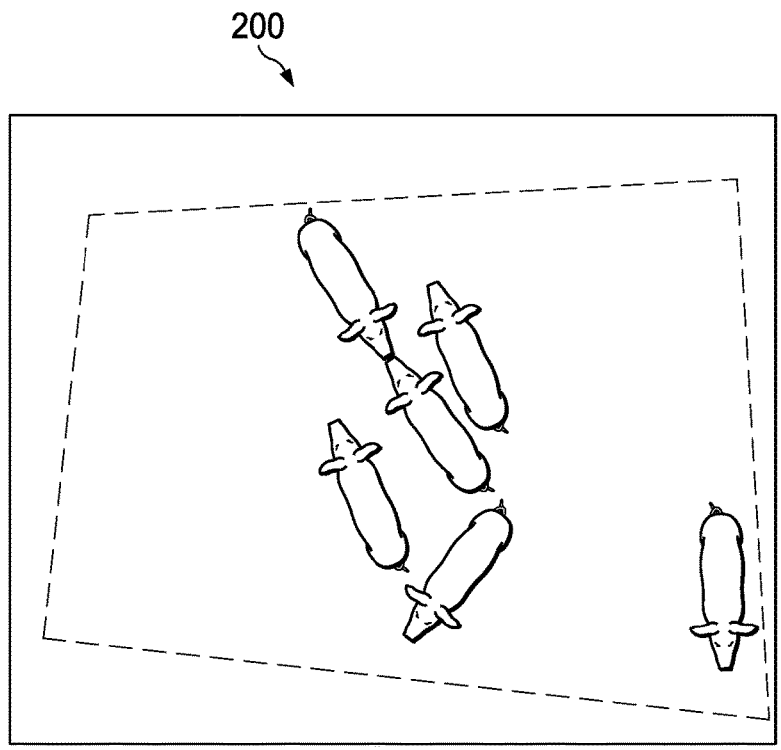
FIGS. 2A-2C depict adjustments made to a pin's floor plane.

In some implementations, an initial step in the process 100 is a one-time user annotation 102 to select corner points that define the pen boundaries, feeder, and waterer (See FIG. 2A). The selection of the pen floor boundaries makes it possible to transform 106 3D points from the motion sensing input device's (e.g., a depth camera) coordinate space to the coordinate space of the $Dim_x \times Dim_y$ pen environment. Pose estimation (Gao et al., 2003, EIII Transactions on Pattern Analysis and Machine Intelligence, 25:930-43) is used to find the position of the camera such that the known 3D corner points of the pen at (X=0, Y=0, Z=0), (X=$Dim_x$, Y=0, Z=0), (X=0, Y=$Dim_y$, Z=0), and (X=$Dim_x$, Y=$Dim_y$, Z=0) project to the four points selected by the user in the image at $(x_1, y_1)$, $(x_2, y_2)$, $(x_3, y_3)$, and $(x_4, y_4)$.

Figure 2B:
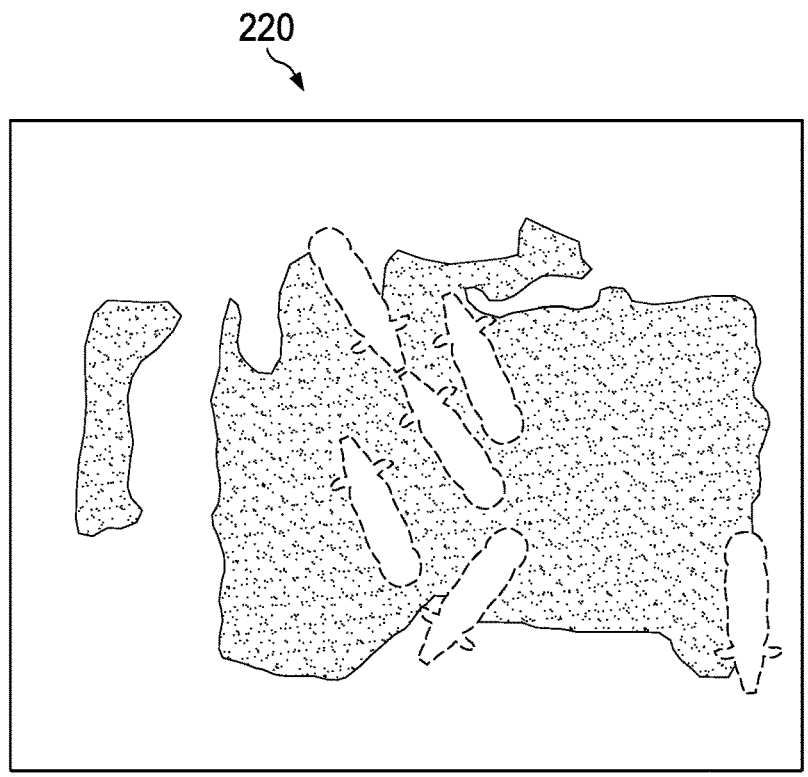
Figure 2C:
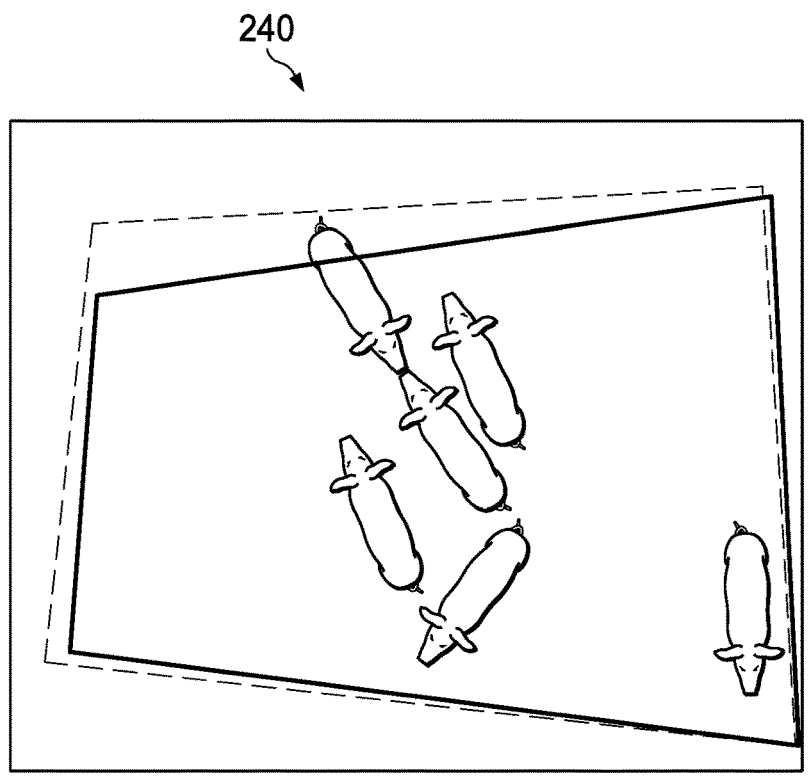

In some implementations, to account for manual selection errors, a RANSAC planefitting routine (Fischler & Bolles, 1981, Commun. ACM, 24:381-95) may be applied to all depth points that lie within the floor plane area selected by the user (See FIG. 2B). This process ensures that the floor plane is closely aligned to the Z=0 plane. Finally, the original four points selected by the user are adjusted so that they lie on the floor plane and conform to the known rectangular dimensions of the pen (See FIG. 2C). FIG. 2A depicts an example 200 of the original selection of the user-selected boundary (dashed line) of the pen floor. FIG. 2B depicts an example 220 of inliers when using random sample and consensus (RANSAC) plane fitting to points within the image space boundary. FIG. 2C depicts an example 240 of the new pen boundary (solid line) with pre-defined dimensions that lies on the plane. In some implementations, to resolve ambiguities, the first point selected by the user and the angle between the first and second point are consistent between the original and new boundaries.

EXAMPLE 3—SPINE/BACK POINT EXTRACTION 108

Figure 3A:
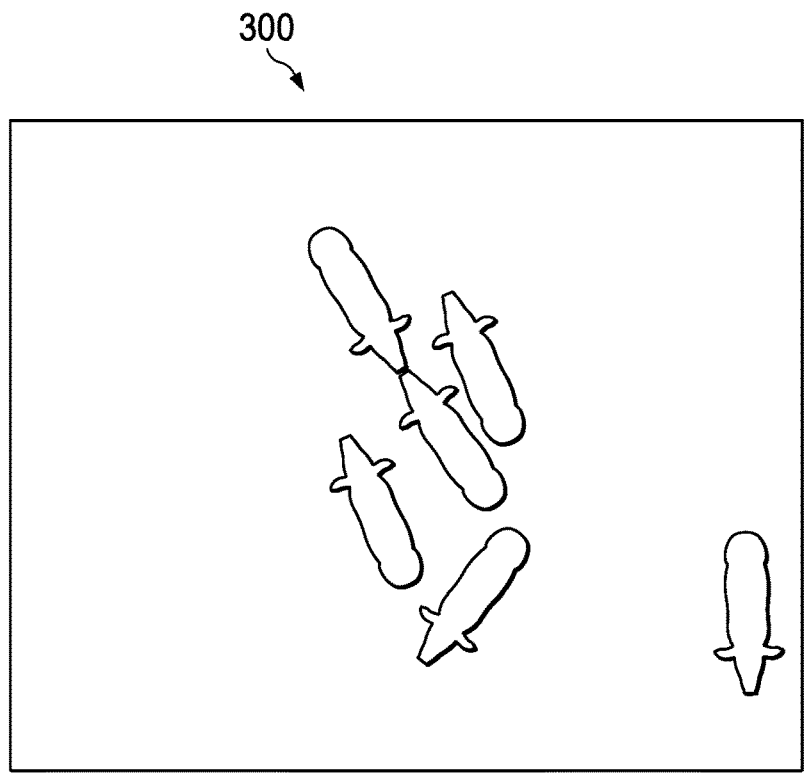
FIGS. 3A-3B depict foreground isolation using known dimensions of the pen and the positions of the feeder and waterer.
Figure 3B:
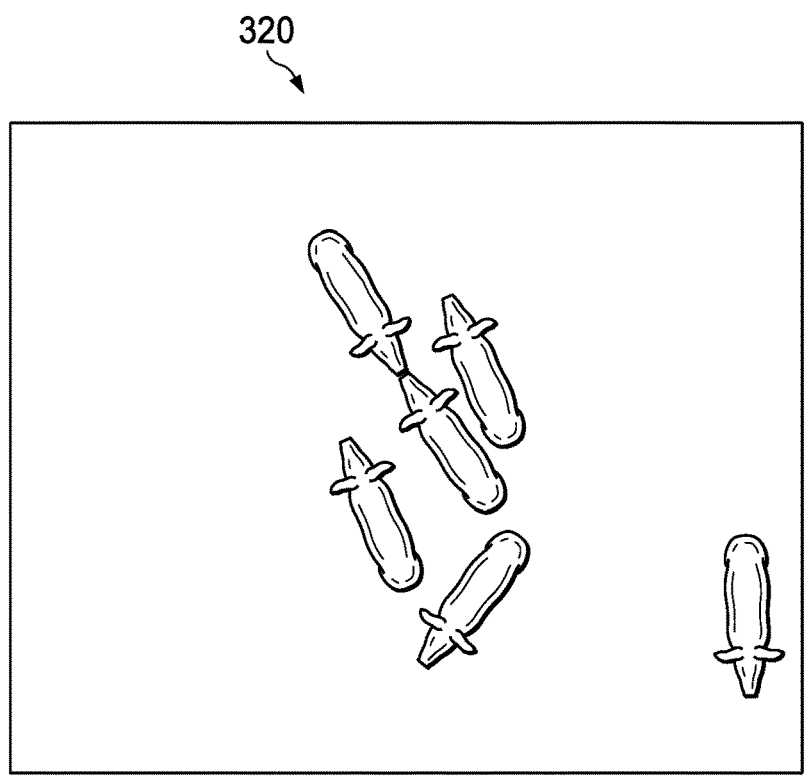

FIGS. 3A-3B depict example foreground isolations 300 and 320 respectively, which were generated using known dimensions of the pen and the positions of the feeder and waterer. The intensities of foreground pixels are mapped to the height of pigs above the ground plane. The normal direction of each foreground points is calculated and the Z component of the normal direction is used to weigh the importance of points for tracking.

In some implementations, after transforming 106 3D point measurements to the pen's coordinate system such that the pen floor is mapped to Z=0, points belonging to the foreground can be isolated from the background by removing all points that lie outside the 3D pen bounds and masking out points that lie in the image space of the feeder and waterer. At time t, this produces a set of 3D points $P^t = \{p_1^t, \ldots, p_N^t\}$ depicted in FIG. 3A. The intensity of pixels by their Z-coordinate or height above the ground plane are encoded and depicted, such as in the example depiction 300.

Because a camera may be capable of only capturing a one-sided surface of each object, the described multi-object tracking system may operate with a partial object representation. For example, the spine/back surface of each pig is often visible from a top-down camera's perspective and, in a manner similar to existing approaches that use ellipses (Kashiha et al., 2013, Comp. Elect. In Agric., 93:111-20; Kashiha et al., 2014, Livestock Sci., 159:141-8; Nasirahmadi et al., 2015, Comp. Elect. In Agric., 119:184-90; Nasirahmadi et al., 2017, Livestock Sci., 202:25-38), the proposed system can model the distribution of each pig's spine/back points using an ellipsoid.

In some implementations, ellipsoidal models applied directly to the 3D points might have difficulty with side-by-side abutting pigs, and choose to combine points into a single ellipsoid when the surfaces of their backs touch. To combat this, each surface point can be analyzed and given a weight corresponding with how likely the point is to be near the crest of the pig's spine/back. The weight of the $n^{th}$ point is found by first calculating the surface normal using the gradients of the 3×3 areas of points that surround the $n^{th}$ point, then setting $w_n^{spine}$ to the absolute value of the Z component of the surface unit normal vector, i.e., areas of the surface that are parallel to the ground plane have weight $w_n^{spine}=1$ and perpendicular areas have weight $w_n^{spine}=0$. These weights are depicted in FIG. 3B as example 320. Due to the physical properties of the objects being tracked, two abutting pigs may be separated by an area with lower surface normal weights than their respective spine/back areas, thus making the two objects easier to separate.

EXAMPLE 4—MULTI-ELLIPSOID EXPECTATION MAXIMIZATION 110

Figure 4B:
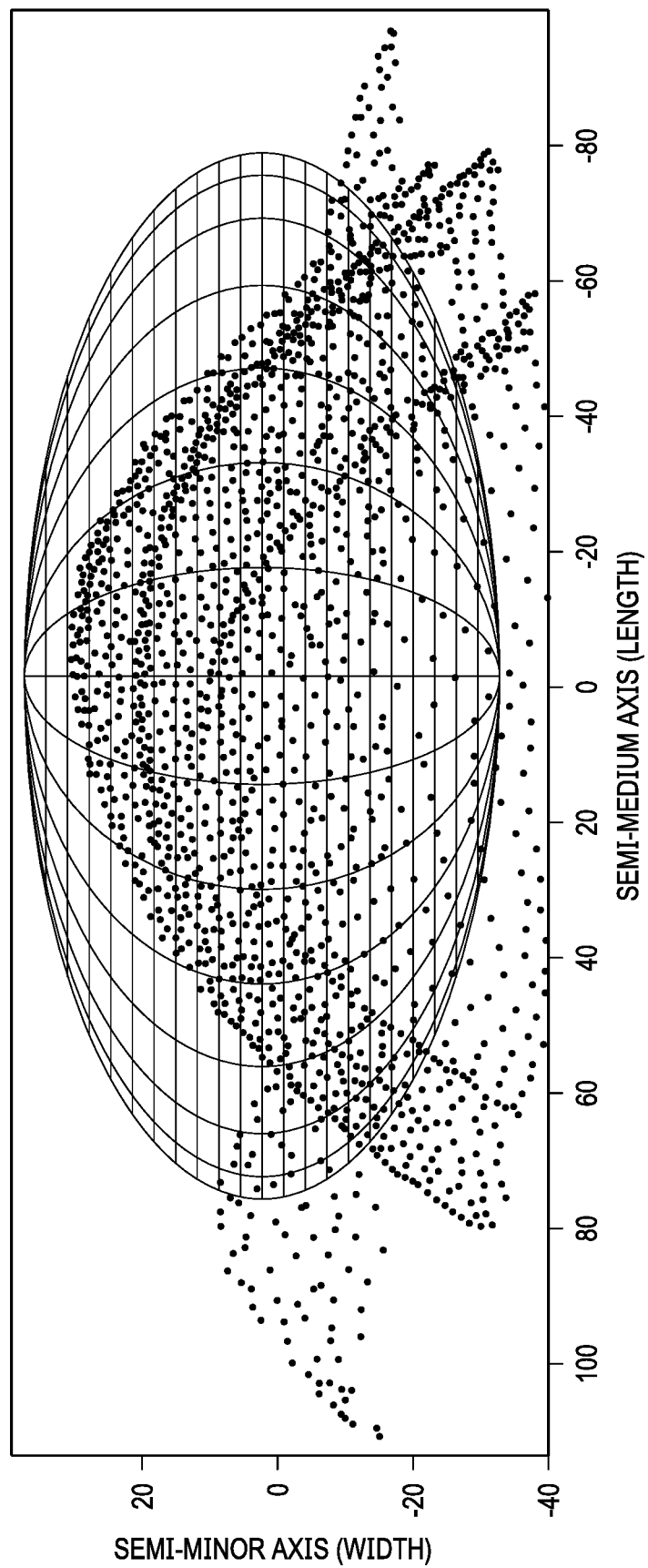
Figure 4C:
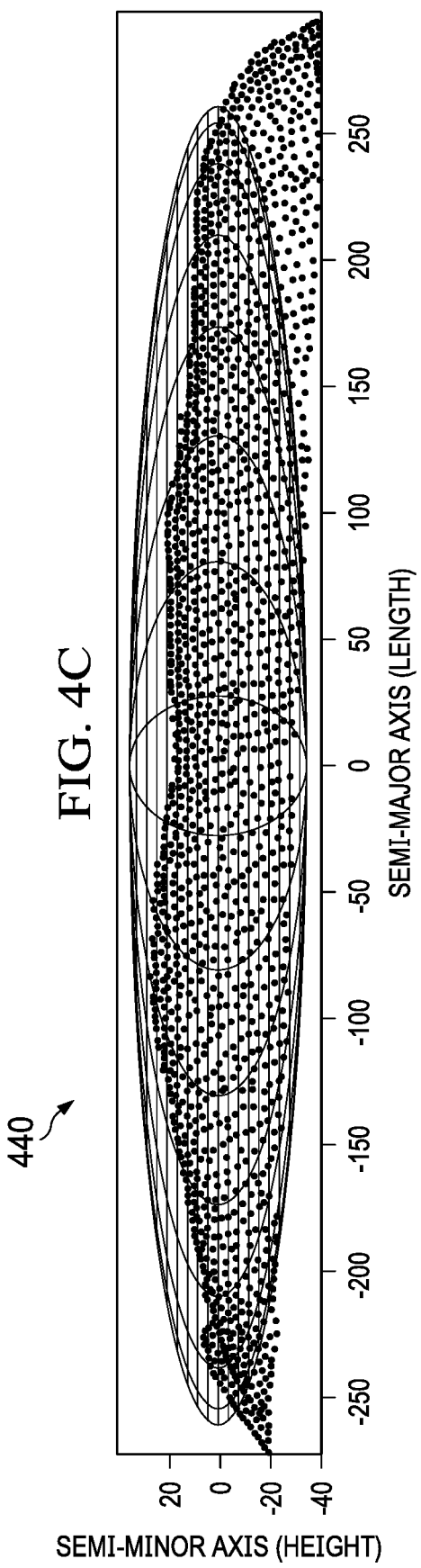

Given a set of spine/back points, the proposed tracking system can maintain the position and orientation of each pig by fitting a fixed-sized ellipsoid to the points. The desired fitting on a set of sample points is illustrated by the examples 400, 420, and 440 in FIGS. 4A-4C respectively. FIG. 4A depicts a top view 400. FIG. 4B depicts a front view 420. FIG. 4C depicts a side view 440. Each the views 400-440 include a centered and orientation-corrected point cloud representing spine/back points along with a fixed-size ellipsoid fit to the points.

The tracking system may operate by enforcing shape consistency between frames while allowing for small movements. In some implementations, the tracking system may be initialized with the pig locations manually and, in all future frames, adjusts the position of an ellipsoid to each new set of spine/back points. The operation is similar in nature to the k-means algorithm and generally falls into the category of hard (Moon, 1996, IEEE Signal Proc. Magazine, 13:47-60), which can be used to estimate the maximum likelihood (ML) solution when an initial set of models and parameters are provided along with a new set of observations.

The ML formulation given in Equations (1) and (2) lends itself to the proposed EM solution, which alternates between an expectation step when assigning maximum-likelihood (minimum distance) clusters to points via a metric that enforces an ellipsoidal distribution (cost estimation and membership assignment), and a maximization step used to recalculate the parameters of the clusters (cluster recalculation). In some example, overall, the algorithm is split into three major steps: 1) cost estimation, 2) membership assignment, and 3) cluster recalculation.

Cost Estimation:

In some implementations, a cost estimation algorithm is designed to track K fixed-sized ellipsoidal targets parameterized by a semi-major axis length $d_{length}$, semi-medium axis length $d_{width}$, and semi-minor axis length $d_{height}$. These parameters may relate to a zero-mean ellipsoid as:

$$\frac{x^2}{d_{length}^2} + \frac{y^2}{d_{width}^2} + \frac{z^2}{d_{height}^2} = 1$$

During tracking, the position and orientation of each target may be characterized by a 3×1 centroid $C_k$ and 3×3 rotation matrix $R_k$, where the columns of $R_k$ are a concatenation of the three orthonormal component orientations of the ellipse (i.e., length, width, and height). Note that this notation drops the superscript t notation for simplicity, and instead the values of $C_k$ and $R_k$ are initialized from the previous sampling time and represent the current estimates throughout the iterative process.

For each target k, N points can be evaluated to determine how likely they are to belong to the $k^{th}$ target's ellipsoid. The cost of membership can be found by projecting the points into a coordinate system where ellipsoid k is centered at the origin, its semi-major axis lies on the X-axis, its semi-medium axis lies on the Y axis, and each of the dimensions are scaled such that the ellipsoid becomes a unit-radius sphere. In some implementations, projection of points into the $k^{th}$ ellipsoid's coordinates is achieved using:

$$p_n^k = V_k \cdot (p_n - C_k) \forall n \in 1, \ldots, N \quad (3)$$

where $$V_k = \begin{bmatrix} \frac{1}{d_{length}} & 0 & 0 \\ 0 & \frac{1}{d_{width}} & 0 \\ 0 & 0 & \frac{1}{d_{height}} \end{bmatrix} \cdot R_k^t, \quad (4)$$

and $p_n$ is a 3×1 vector representing the XYZ coordinates of point n.

The cost of assigning point n to target k may then be set to the distance between the $n^{th}$ point and the center of ellipsoid k given by:

$$\Delta_{n,k} = \|p_n^k\|. \quad (5)$$

The cost of possible assignments between points and target ellipsoids may be evaluated and stored in the N×K matrix $\Delta$.

Membership Assignment:

Prior to membership assignment, the cost matrix $\Delta$ may be used to compute the vector:

$$m = \begin{bmatrix} m_1 \\ m_2 \\ \vdots \\ m_N \end{bmatrix} \text{ s.t. } m_n \quad (6)$$

$$= \sum_{k=1}^{K} 1\{\Delta_{n,k} < \tau_e\},$$

which is the number of different ellipsoids that are within a distance $\tau_e$ of each point. Note that $1\{A\}$ is the indicator function which returns a value of 1 if the expression A is true and 0 if the expression A is false. The vector m is used to encourage separation between ellipsoids by applying a penalty to the cost matrix using $$\Delta' = \begin{bmatrix} m_1 & 0 & \ldots & 0 \\ 0 & m_2 & \ldots & 0 \\ \vdots & \vdots & \ddots & \vdots \\ 0 & 0 & \ldots & m_N \end{bmatrix} \begin{bmatrix} \Delta_{1,1} & \Delta_{1,2} & \ldots & \Delta_{1,K} \\ \Delta_{2,1} & \Delta_{1,2} & \ldots & \Delta_{2,K} \\ \vdots & \vdots & \ddots & \vdots \\ \Delta_{N,1} & \Delta_{N,2} & \ldots & \Delta_{N,K} \end{bmatrix}, \quad (7)$$

e.g., points that lie within re of two existing ellipsoids will have their cost doubled. The minimum cost for each point may then be found using:

$$\Delta_n^{min} = \min_{k=1,\ldots,K} (\Delta'_{n,k}) \forall n \in \{1, \ldots, N\}. \quad (8)$$

For each target, the set of membership indices:

$$\mathbb{P}_k = \left\{ n \mid k = \frac{\text{argmin}(\Delta'_{n,k})}{k' = 1, \ldots, K} \text{ and } \Delta_n^{min} < \tau_o \right\} \quad (9)$$

includes all points whose closest target is k and are within a set distance of the $k^{th}$ ellipsoid. The threshold $\tau_0$ allows movement between previous and current positions. If a distance of 1.0 corresponds to the boundaries of a tight-fitting ellipsoid, $\tau_0$ should be greater than 1.0 so that it includes points that have moved outside the original ellipsoid position.

Cluster Recalculation:

After points are uniquely assigned to each target, the centroid and orientation of the ellipsoid may be recalculated. Points are first assigned a weight:

$$w_{n,k} = w_n^{spine} \cdot \left(1 - \frac{\Delta_n^{min}}{\sum_{k''=1}^{K} \Delta'_{n,k'}}\right) \forall n \in \mathbb{P}_k \quad (10)$$

to incorporate the likelihood of a point to be near the crest of the spine/back. Note that costs in (10) are mapped between 0 and 1 to approximate the probability of membership. Cluster centroids are then found using $$C_k = \frac{\sum_{n \in \mathbb{P}_k} w_{n,k} \cdot p_n}{\sum_{n \in \mathbb{P}_k} w_{n,k}} \forall k \in \{1, \ldots, K\}. \quad (11)$$

To find the orientation of the cluster, the points are first mean-corrected and weighted using:

$$p'_n = w_n^{spine} \cdot (p_n - \bar{p}) \forall n \in \mathbb{P}_k. \quad (12)$$

Because the weighted points are generally not evenly distributed around the centroid, mean correction is applied again using:

$$p''_n = p'_n - \bar{p}') \forall n \in \mathbb{P}_k. \quad (13)$$

Principal component analysis (PCA) may be applied to the set $\{P''_n\}$ to find the dominant 1×3 orientation of the ellipsoid, denoted by $R_{k,length}$. The semi-medium axis of the ellipsoids is forced to be orthogonal to both the dominant orientation and the Z axis using the cross product:

$$R_{k,width} = \frac{[0,0,1]^T \times R_{k,length}}{\|[0,0,1]^T \times R_{k,length}\|}.$$

Finally, the direction of the third dimension of the ellipsoid is found using $R_{k,height} = R_{k,width} \times R_{k,length}$, and the rotation matrix corresponding to the orientation of the ellipsoid is given by $$R_k = [R_{k,length}, R_{k,width}, R_{k,height}] \quad (14)$$

Figure 5:
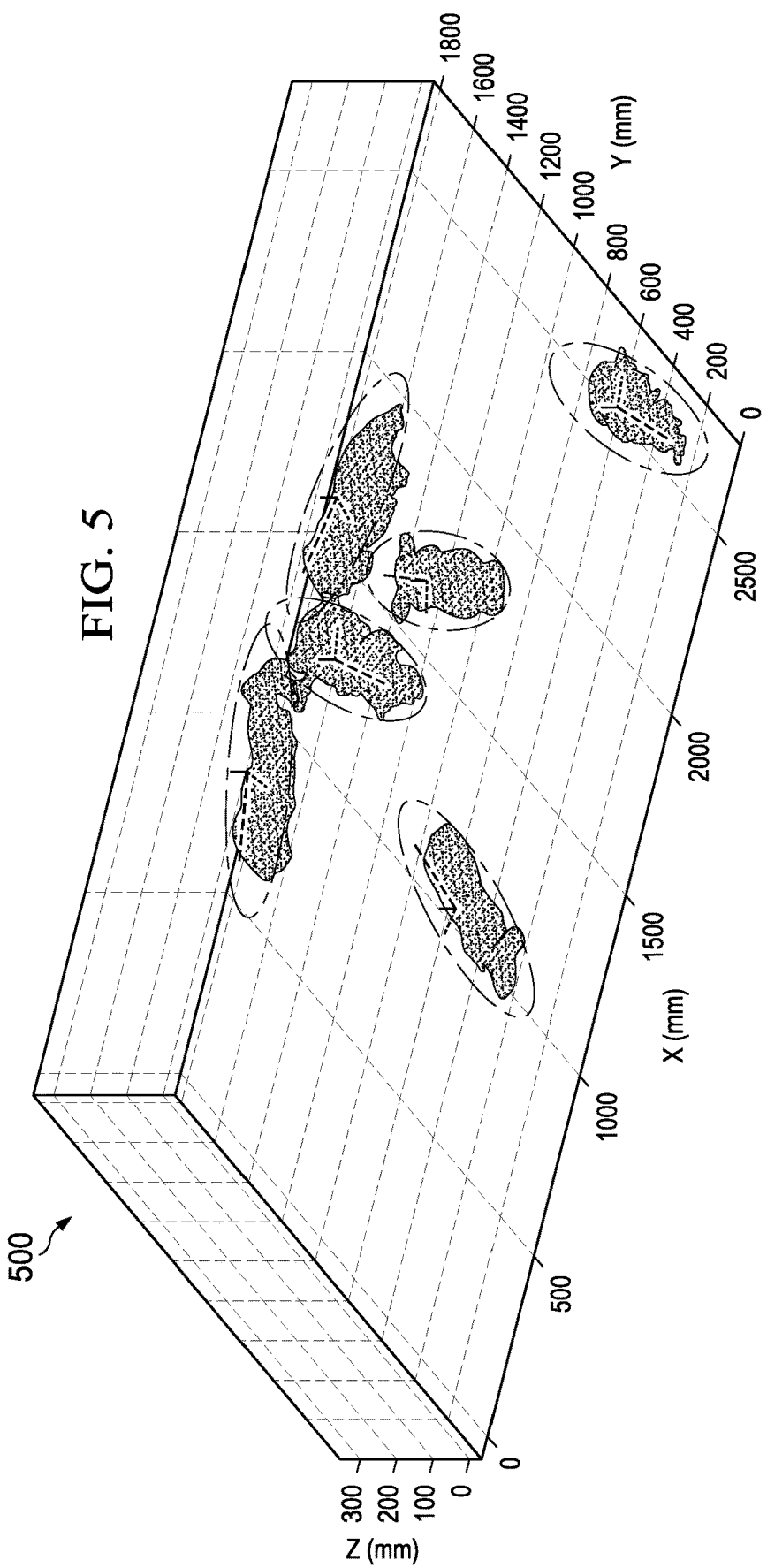
FIG. 5 depicts an ellipsoid-fitting used by the described multi-object tracking system.

While the vector $R_{k,length}$ would be sufficient to represent the orientation, the rotation matrix $R_k$ is used in (3) and (4) to normalize points to each ellipsoid's coordinate system. FIG. 5 depicts an example 500 of the ellipsoids fit to a set of 3D points, along with their three axes. Each distinct pattern depicted in example 500 represents an individual pig, and each ellipsoid fit to the pig is represented by a triaxial ellipsoid. The semimajor axes (length) are shown as dashed lines, the semi-minor axes (height) are shown as solid lines, and the semimedium axes (width) are shown in dotted lines.

It is worth noting that the operations used to compute $R_k$ may assume that the shapes of targets conform to a flattened ellipsoid, where $R_k$ width s parallel to the ground plane. This has been empirically found to work well for point distributions extracted from top-down view, because it forces the height of ellipsoids to be relatively small and makes it possible to keep track of multiple ellipsoids as they pass over one another. With different target shapes or camera angles, the method presented in this section may not be suitable and may require modifications of the ellipsoid properties.

EXAMPLE 5—MOTION FILTERING USING ADAPTIVE EXPONENTIAL SMOOTHING

A problem that a multi-object tracking system may address is the issue of occlusions. From an overhead perspective of the group-housed environment, they are often the result of one animal stepping over another that is lying down. Therefore, the degree of visibility is often directly proportional to mobility. In some implementation, the described multi-object tracking system my employ an adaptive formulation of the exponential smoothing tracker (Brown & Meyer, 1961, Operations Res., 9:673-85) to improve tracking performance in the presence of occlusions.

As an example, for each target k, the metric of visibility may be given by:

$$\alpha_k = \frac{|\mathbb{P}_k|}{\max\limits_{k=1,\ldots,K} |\mathbb{P}_k|} \forall k \in \{1, \ldots, K\}, \quad (15)$$

where it is assumed that at least one target is fully visible, and assigned $\alpha_k = 1$. In contrast, a completely occluded target is assigned the value $\alpha_k = 0$. Exponential smoothing can be applied by combining the values of $C_k^t$ and $R_{k,length}^t$ at time t with the value from the previous time t−1 using:

$$C_k^t \leftarrow \alpha_k C_k^t + (1-\alpha_k) C_k^t \quad (16)$$

and $$R_{k,length}^t \leftarrow \alpha_k R_{k,length}^t + (1-\alpha_k) R_{k,length}^{t-1}. \quad (17)$$

The procedure in Cluster Recalculation, as described above, may then be applied to ensure that $R_t^k$ is orthonormal. It should be noted that this formulation of exponential smoothing is similar to the Kalman filter observation update, where the noise in the observation is inversely proportional to $\alpha_k$ (Bishop & Welch, 2001, Proc. of SIGGRAPH, Course, 8:41). However, the formulation presented here avoids the need to compute multivariate statistics modeling the noise of the observations with respect to the ground truth. Algorithm 1 summarizes multi-ellipsoid EM.

EXAMPLE 6—SYSTEM OVERVIEW

Figure 6A:
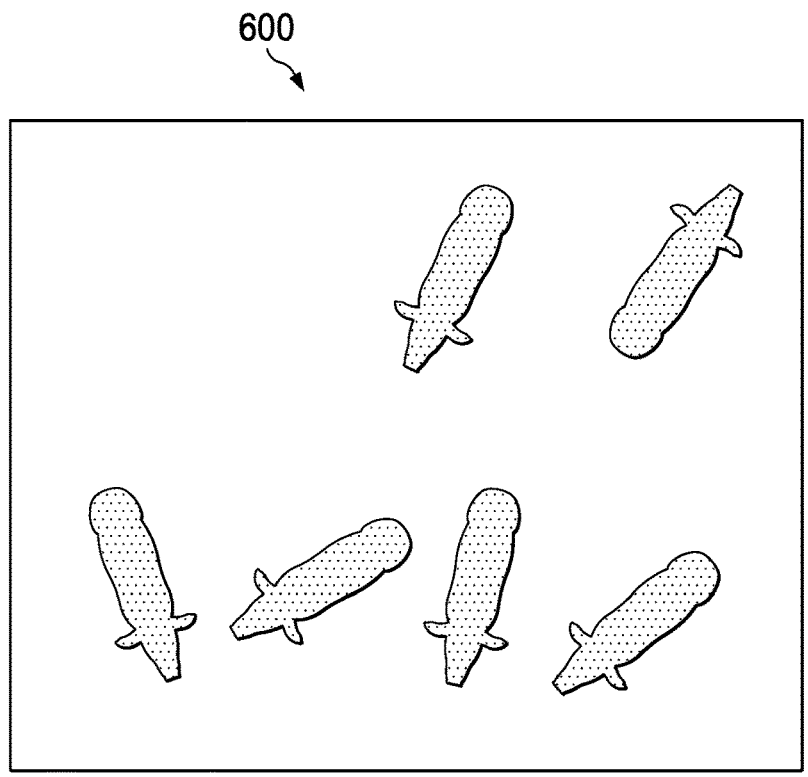
FIGS. 6A-6B depict example frames captured by the motion sensing input device of a group-housed environment.
Figure 6B:
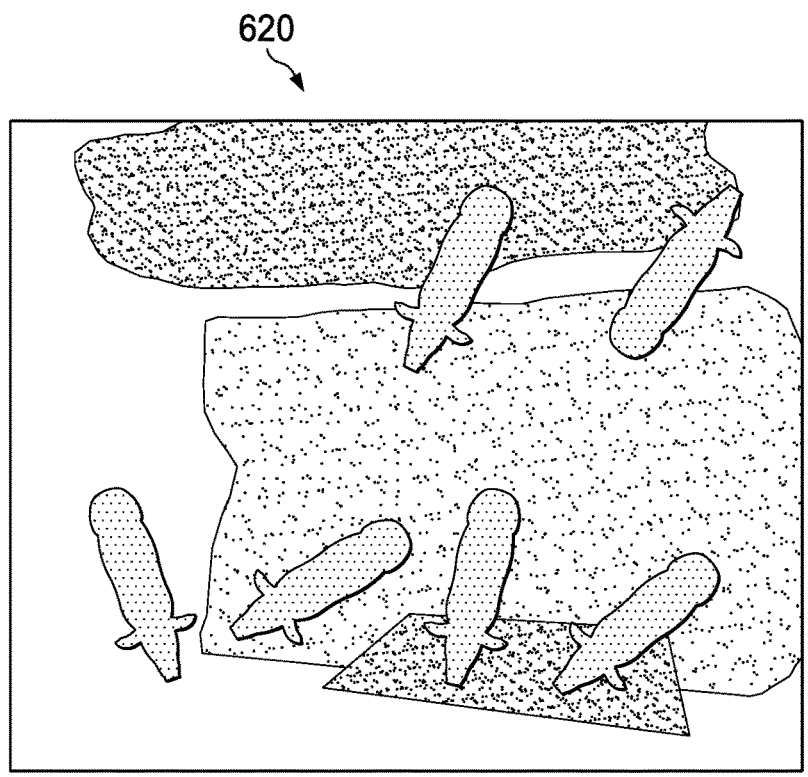

As an example, to evaluate the described multi-object tracking system, a continuous sequence of 2,100,000 frames was captured over a 5-day period at Union Farms in Ulysses, Nebr. Images were captured using a downward-facing Microsoft Kinect v2 camera mounted 2.1 meters above a 1.5×2.5 meter pen containing 15 pigs. An example depicting an infrared frame 600 and an example depicting a depth frame 620 are shown in FIGS. 6A and 6B respectively. In the example, the infrared/depth camera was calibrated to obtain lens parameters and corresponding distortions were removed from all images used in the experiments.

---

Algorithm 1 Tracking using Multi-Ellipsoid Expectation Maximization

```
capture initial infrared frame I
for each target index k = [1,...,K] do
    (C_k,R_k) ← userInput(I)
end for
for every new depth frame D do
    (p, w^spine) ← getPointsAndWeights (D) [Example 3]
    for each target index k = [1,...,K] do
        Δ_k ← estimateCost(p,C_k,R_k) [Eq. (3)-(7)]
        Pk ← clusterMembership(Δ_k) [Eq. (9)]
        (C_k,R_k) ← calculateEllipsoidParameters(Pk) ) [Eq. (10)-(14)]
        (C_k,R_k) ← motionFiltering(C_k,R_k) ) [Eq. (15)-(17)]
    end for
end for
```

---

During times of inactivity, the positions of targets remains constant, so an adaptive-rate frame capture method was used to reduce the computational workload without sacrificing target tracking accuracy. After capturing the initial R×C depth frame, denoted $D_{old}$, the difference between it and each new frame, $D_{new}$, may be given by:

$$D_{diff}(r, c) = \begin{cases} |D_{old}(r, c) - D_{new}(r, c)| \\ \text{if } D_{old}(r, c) \text{ and } D_{new}(r, c) \\ \text{valid otherwise} \\ 0 \end{cases} \forall r \text{ and } c, \quad (18)$$

where invalid depth values are indicated by $D(r,c)=0$ when using the Kinect v2. The metric $$m = \frac{1}{R \times C} \sum_{\substack{r=1,\ldots,R \\ c=1,\ldots,C}} 1\{D_{diff}(r, c) > \tau_d\}, \quad (19)$$

measures the percentage of depth measurement points that experience movement, where the threshold $\tau_d$ is used to differentiate between true movement in the scene and noise in the depth measurements. When using the Kinect v2 depth camera, the value of $\tau_d$=5 cm was used, as it was empirically observed that depth measurement errors rarely exceed this threshold. Finally, a threshold on the value of m was used to determine whether or not a new frame should be captured and processed. If the value of m>$\tau_m$, $D_{old} \leftarrow D_{new}$ was set before moving on to the next frame.

The parameters used during the experiment are given in the algorithm above. Frame rates varied from 0 to 30 fps and averaged 5 fps over the entire duration of the system deployment. Dimensions of ellipsoids encapsulating the animal backs, namely $d_{length}$, $d_{width}$, and $d_{height}$ were determined in two stages: 1) $d_{length}$ was estimated empirically as the upper bound of half the overall length of the animal (from snout to tail); 2) $d_{width}$ and $d_{height}$ were determined by calculating the ratio of square roots of the eigenvalues of the covariance matrix computed for the spine/back points. For this calculation, 118 samples were randomly selected. Additionally, any samples where only a partial set of spine/back points is visible was rejected. The resultant ratios of $$\frac{d_{width}}{d_{length}} = 0.31$$

and $d^{height}$ dlength=0.15 were determined by applying the analysis to each sample, and computing the average ratios.

To reduce the computing resources required by the proposed tracking method, the density of the points was reduced using 25:1 subsampling of the surface prior to extracting spine/back points. In the experiments presented in Example 7, subsampling resulted in an a 5.71× reduction in processing time with no perceived reduction in tracking accuracy.

Figure 7:
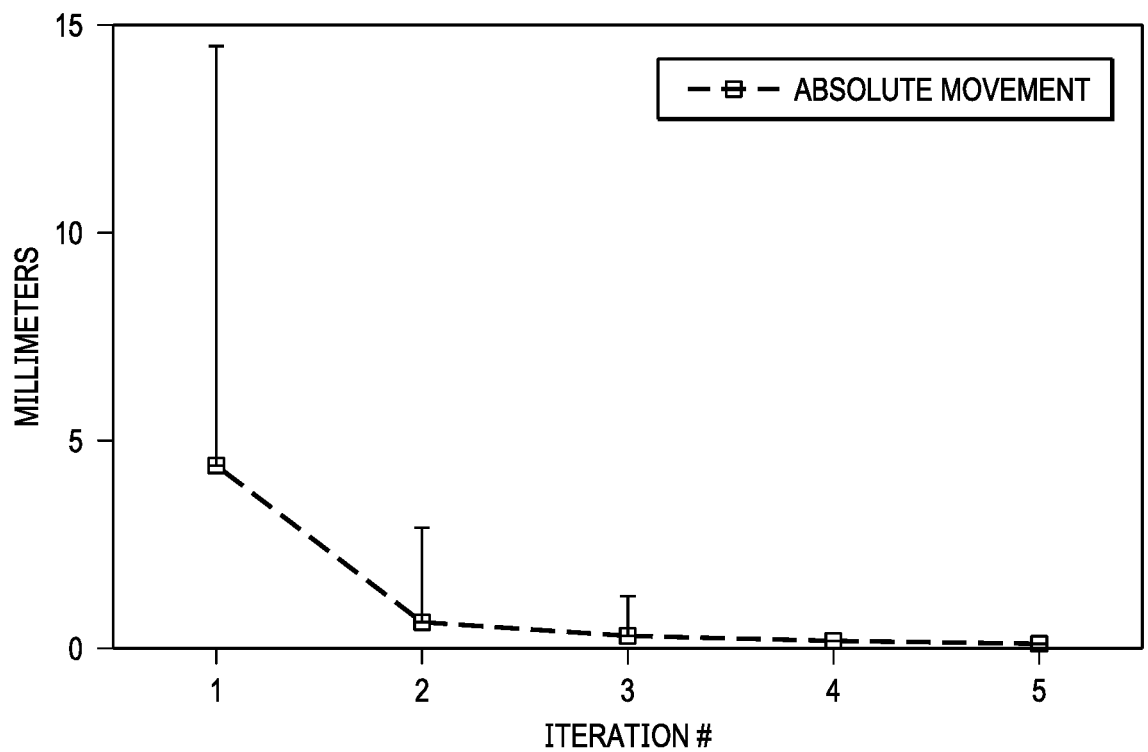
FIG. 7 depicts a graph of the mean absolute movement of ellipsoid centers as a function of iteration number for multi-ellipsoid expectation maximization.

To examine the system's convergence as a function of iterations, a sequence of 7000 frames using a total of five iterations per frame was employed. This particular sequence was chosen due to the relatively high activity levels of the pigs. FIG. 7 depicts a graph 700 of the mean absolute movement of ellipsoid centers as a function of iteration number for multi-ellipsoid expectation maximization. The graph 700 plots the mean absolute distance that the ellipsoids were adjusted during each iteration, along with lines illustrating the 90% quantile, (the point at which 90% of samples are at or below). Sample points were obtained from 7000 consecutive frames of tracking for 15 pigs. The squares represent the mean and 90% of samples lie below the limits defined by the vertical bars. Note that after the third iteration, the 90% line is below 0.2 mm.

The results indicate that after three iterations, the amount of movement is reduced to fractions of a millimeter, thus three iterations were used in the experiments. It is worth noting that using an arbitrarily large number of iterations was observed to cause unwanted drift in the ellipsoids when trying to fit mostly occluded targets.

TABLE 1

| Parameter | Value | Description |
|---|---|---|
| dlength | 260.0 mm | Semi-major axis length of the ellipsoid |
| dwidth | 80.0 mm | Semi-medium axis length of the ellipsoid |
| d/height | 40.0 mm | Semi-minor axis length of the ellipsoid |
| $\tau_e$ | 1.5 | Ellipsoid dimension multiplier for multiple membership penalization (repulsion) |
| $\tau_o$ | 2.0 | Ellipsoid dimension multiplier for valid membership assignment |
| $\tau_d$ | 50 mm | Minimum depth difference between frames required for movement |
| $\tau$m | 0.002 | Minimum proportion of pixels with movement required for frame capture |

Table 1 depicts parameters used in the example experiments, along with their respective values and descriptions.

Implementations of the current disclosure may employ a variety of visual marker techniques, such as ear tags, to alleviate the visual identification problem. For example, ear tags may include a combination of colors and/or numbers that allow an observer to identify specific animal from a video feed. In some implementations, blue, green, red, yellow, and white with the numbers 1, 22, and 333 for a total of 15 combinations are used.

Visual markers, such as ear tags, may also be employed for automated detection. Specifically, a two-stage deep learning framework for automated detection and classification of tags from video frames may be employed in the disclosed solution. The first stage may include an R-CNN stage that identifies the locations of each tag in the images (Ren et al., 2015, In Advances in neural information processing systems, pp. 91-99). The second stage may include a network that classifies the tags into one of the 15 types (Krizhevsky et al., 2012, In Advances in neural information processing systems, pp. 1097-1105). In some implementations, detection and classification may be joined into the same fully convolutional neural network to speed up processing.

EXAMPLE 7—RESULTS

Multi-object trackers may be evaluated using bounding box overlaps with manually annotated frames (Song and Xiao, 2013, In Proc. IEEE Inter. Conf. Comp. Vision, pp 233-40), this approach may be unsuitable for evaluating the performance of the described multi-object tracking system. This is because tracking results largely adhere to a binary state: either perfect overlap or a well-defined tracking error. Bounding box overlap also does not consider the orientation of targets, which is important for tracking animal activities. A more appropriate evaluation for detection-free tracking may be performed by initializing the positions of all targets and letting the tracking system proceed until an error is observed.

Figure 8A:
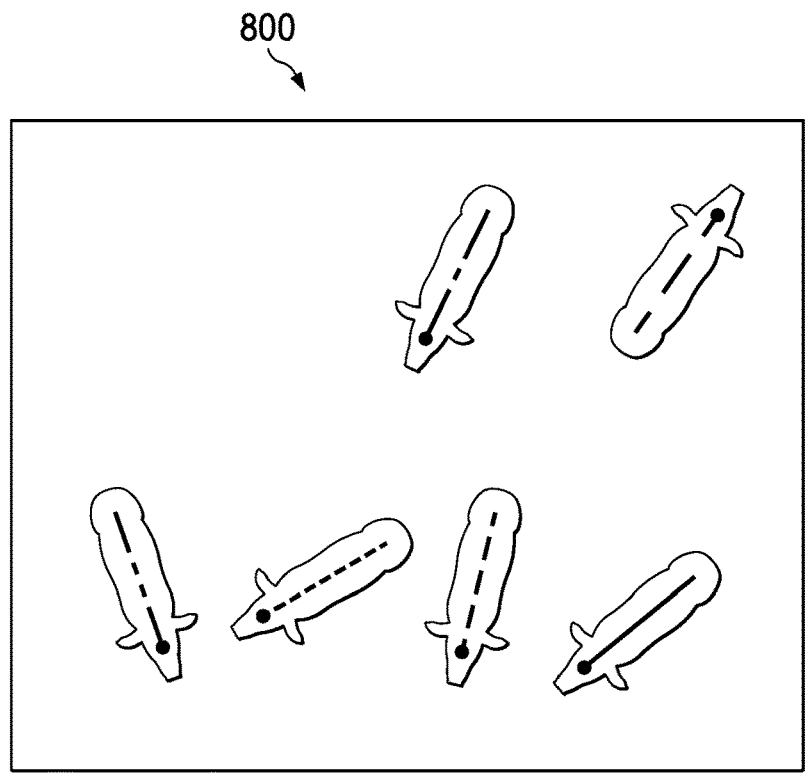
FIG. 8A depicts an example of user-defined initialization of the pigs' heads and tails, which are used to initialize the multi-ellipsoid tracking.
Figure 8B:
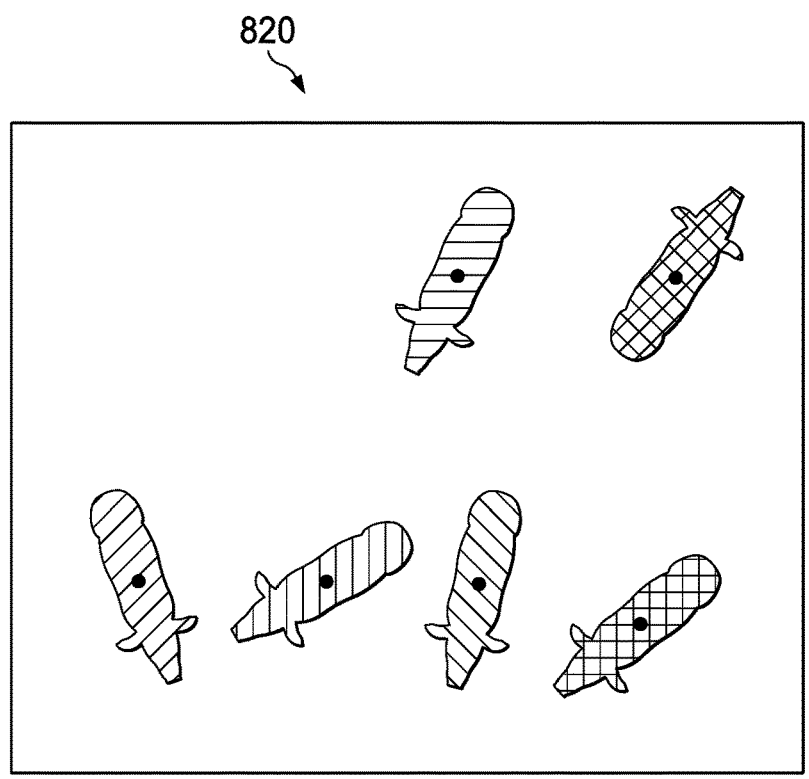
FIG. 8B depicts an example where the membership of each subsampled point is illustrated by the points.

FIG. 8A depicts an example of user-defined initialization of the pigs' heads and tails, which are used to initialize the multi-ellipsoid tracking. FIG. 8B depicts an example where the membership of each subsampled point is illustrated by the points. In one example, as depicted in FIGS. 8A and 8B, a total of 30 starting points were randomly chosen from the dataset. The specific activities performed by the pigs also represents a random sampling. An example of manual initialization is illustrated in FIGS. 8A and 8B. It should be noted that frames where one or more pigs is mostly occluded were not used for initialization, because position and orientation cannot be reliably obtained if the pigs are not sufficiently visible in the image.

Three distinct types of tracking errors were observed during the trails: orientation flips, lost tracks, and label swaps. During an orientation flip, the head (marked with a circle in FIG. 8A) moves to the position of the tail and vice versa. The second type of error is a lost track, where the centroid of the ellipsoid moves away from the intended cluster and none of the target's points are considered valid members according to (9). Finally, the third type of error, referred to as swap labels, occurs when the ellipsoids from more than one pig are shuffled and no longer match their original targets.

Table 2 presents the results. On average, the described multi-object tracking system maintains the position and orientation of all pigs for 2767 consecutive frames, or 592.2 seconds before a tracking error occurs. Assuming symmetry between forward and backward tracking, an average of 5534 frames or 1184.4 seconds should exist between tracking errors. In contrast, when the motion filtering described in Example 5 is removed (i.e., $\alpha_k=1$), the tracking system only maintains tracks for an average of 612 frames. This is a 4.5× increase in the duration of reliability that can be attributed to motion filtering. The most common cause of failure without motion filtering was lost depth data due to flies walking in front of the depth camera. With motion filtering, the lost data results in a value of $\alpha_k=0$ in (15), and the object maintains its state until the object reappears. Due to the high probability that the pig does not move more than one centimeter (depicted in FIG. 7) from one frame to the next, motion filtering is robust to this type of lost data. In contrast, when all N points are given equal surface weight $W_n^{spine}=1$, error-free tracking persists for an average of 1467 frames. The weights help to separate abutting pigs by encouraging ellipsoid fitting to align with the crest of the spine/back.

In terms of the distribution of error types, a total of six, 12, and 12 errors were caused by orientation flips, lost tracks, and swapped labels, respectively. In many cases, orientation flips could be corrected with additional processing, for example, by tracking the direction of movement and forcing it to be forward. Lost tracks could likely be corrected by using per-frame detection and looking for targets with no assigned labels. The last, and most challenging type of error is swapped labels. To correct for swapped labels, it may be necessary for the tracking system to distinguish between targets using some form of fingerprinting.

TABLE 2

| Trial # | Seconds | Frames | FPS | Cause of Failure | Frames ($\alpha_k = 1$) | Frames ($W_n^{spine} = 1$) |
|---|---|---|---|---|---|---|
| 1 | 1665.1 | 8829 | 5.30 | Lost Track | 237 | 4548 |
| 2 | 113.5 | 1125 | 9.91 | Orientation Flip | 465 | 154 |
| 3 | 1480.6 | 8450 | 5.71 | Swap Labels | 1225 | 2977 |
| 4 | 1586.9 | 4840 | 3.05 | Orientation Flip | 924 | 1949 |
| 5 | 123.4 | 728 | 5.90 | Swap Labels | 645 | 645 |
| 6 | 325.3 | 2878 | 8.85 | Orientation Flip | 260 | 937 |
| 7 | 16.6 | 151 | 9.10 | Orientation Flip | 163 | 2019 |
| 8 | 116.0 | 1373 | 11.84 | Lost Track | 1220 | 1534 |
| 9 | 8.0 | 62 | 7.75 | Swap Labels | 62 | 62 |
| 10 | 188.0 | 1407 | 7.48 | Lost Track | 309 | 1407 |
| 11 | 188.0 | 898 | 4.78 | Orientation Flip | 33 | 898 |
| 12 | 1140.9 | 4686 | 4.11 | Swap Labels | 57 | 3057 |
| 13 | 1440.8 | 7440 | 5.16 | Lost Track | 2041 | 2041 |
| 14 | 514.7 | 3400 | 6.61 | Lost Track | 98 | 1683 |
| 15 | 1200.0 | 2510 | 2.09 | Lost Track | 1249 | 2510 |
| 16 | 28.2 | 302 | 10.71 | Swap Labels | 135 | 135 |
| 17 | 234.8 | 990 | 4.22 | Lost Track | 912 | 912 |
| 18 | 144.5 | 581 | 4.02 | Swap Labels | 252 | 310 |
| 19 | 10.8 | 152 | 14.07 | Lost Track | 114 | 214 |
| 20 | 101.8 | 966 | 9.49 | Lost Track | 735 | 440 |
| 21 | 1089.7 | 3527 | 3.23 | Lost Track | 1295 | 3527 |
| 22 | 87.1 | 727 | 8.35 | Lost Track | 727 | 727 |
| 23 | 394.1 | 1479 | 3.75 | Swap Labels | 1203 | 868 |
| 24 | 1408.8 | 9843 | 6.99 | Swap Labels | 485 | 2192 |

TABLE 2-continued

| Trial # | Seconds | Frames | FPS | Cause of Failure | Frames ($\alpha_k = 1$) | Frames ($W_n^{spine} = 1$) |
|---|---|---|---|---|---|---|
| 25 | 859.7 | 2195 | 2.55 | Swap Labels | 70 | 2195 |
| 26 | 169.1 | 1890 | 11.17 | Lost Track | 990 | 189 |
| 27 | 46.3 | 417 | 9.01 | Orientation Flip | 1234 | 417 |
| 28 | 1292.5 | 5622 | 4.35 | Swap Labels | 907 | 2410 |
| 29 | 255.1 | 2653 | 10.40 | Swap Labels | 252 | 2588 |
| 30 | 1536.6 | 2877 | 1.87 | Swap Labels | 75 | 479 |
| Average | 592.2 | 2767 | 6.73 | | 612 | 1467 |

Table 2 depicts example tracking results for the proposed multi-ellipsoid expectation maximization tracking method. In each trial, positions and orientations of 15 pigs were manually assigned in the first frame. In the last frame of each trial, a failure event was caused by either a lost track, orientation flip, or a swap of labels. Higher FPS corresponds with higher activity levels due to adaptive frame capture.

Due to its assumption of a constant number of homogeneous targets and a reliance on depth map processing, it may be difficult to make direct comparisons between the proposed method and existing work. However, Giancardo et al. (Giancardo et al., 2013, PLoS One, 8:e74557) also attempt to achieve long term tracking of homogeneous populations of animals by tracking multiple mice in a confined living space through thermal image processing. While their system also employs a form of EM for tracking, it requires manual intervention due to tracking errors approximately once every 30 seconds. Sarafi et al. (2016, In Vis. Observ. Analy. Vertebrate and Insect Behavior, pp 2411-8) improve upon the method by incorporating SIFT features and optical flow-based segmentation, achieving error-free tracking of two targets for an average of 193 seconds. In one of the more closely related works, Ahrendt et al. (2011, Comp. Electr. Agric., 76:169-74) propose a method for tracking pigs from video that uses 5D Gaussian models of each pig's spatial coordinates and color values. Their method, which also employs a camera with a top-down view of a pig pen, uses the Mahalanobis distance to measure similarity between frames and achieves up to eight minutes of continuous tracking of three pigs. The results demonstrated in this section improve upon prior works by tracking 15 targets for nearly 20 minutes between tracking errors.

Preliminary results when using ear tags demonstrate the accuracy of deep learning for tag detection. When combined with the multi-ellipsoid tracker, the described multi-object tracking system was able to automate continuous localization and detection of basic activities for the entire duration of the trial. The combination effectively operates by automatically resolving label swaps, orientation flips, and lost tracks whenever a tag is identified with very high probability. To evaluate the accuracy, we randomly sampled the annotated video at 68 points and compared the observed localization and activity detection to the system's results. The results given in Table 3 demonstrated that, when standing/walking, the pigs' locations, orientations, and identities are detected with 99.8% accuracy. When lying down, the accuracy drops to 92.5% accuracy.

TABLE 3

| | Label Swap Standing | Label Swap Lying | Orientation Flip Standing | Orientation Flip Lying | Lost Track Standing | Lost Track Lying |
|---|---|---|---|---|---|---|
| Occurances | 0 | 36 | 1 | 16 | 1 | 24 |

Table 3 depicts a number of errors observed an example with 68 randomly sampled frames with 1020 detections. Each error is separated into two categories: 1) errors that occur when the pig is standing (including walking, eating, and drinking) and 2) errors that occur when the pig is lying down.

TABLE 4

| Observed\Detected | Lying | Standing/Walking | Eating | Drinking |
|---|---|---|---|---|
| Lying | 660 | 6 | 0 | 0 |
| Standing/Walking | 2 | 175 | 5 | 5 |
| Eating | 0 | 4 | 143 | 0 |
| Drinking | 0 | 4 | 0 | 16 |

Table 4 depicts a confusion table illustrating the accuracy of manual observation vs. automated detection in a example. A total of 68 and 1020 activities were observed in the example.

The difficulty of tracking pigs that are lying down is due to, for example, their tendency to be occluded by other pigs that might be lying on top of them or stepping over them. In terms of activity detection, the results in Table 4 demonstrate that, when the pig was lying down, their activity was correctly identified 99.1% of the time. When eating, this activity was detected with 97.3% accuracy, while drinking events were correctly identified 80.0% of the time. Errors associated with drinking event detections are likely due to the small area designated to the drinking cup and the relative inaccuracy of the head localization. In some implementation, these errors may be overcome with a water meter that is synchronized with the video capture and/or more sophisticated methods for drinking activity detection that do not merely rely on the relative proximity of the head to the drinking cup.

EXAMPLE 8—CONCLUSIONS

The described multi-object tracking system may be employed for tracking the position and orientation of group-housed animal, such as the example context of pigs, using a consumer-level depth camera. Assuming that each animal roughly conforms to an ellipsoidal shape, the method operates by iteratively adjusting the position of ellipsoids fitted to 3D points along the spine/back of each animal. The example results demonstrate that the multi-object tracking system can track the position and orientation of at least 15 animal simultaneously for an average of at least 19.7 minutes between error events, meaning that a user would be required to manually correct tracking errors an average of 3 times every hour.

In the context of multi-object tracking, the proposed method can be used to generate tracklets, what may include consecutive estimates of position and orientation that are highly likely to belong to the same target. It is possible that a more sophisticated movement model and assignment strategy could be used to join tracklets and improve the duration of reliable tracking and reduce label swaps. However, swaps are still likely to occur due to occlusions of multiple targets caused by group lying behaviors or from insects crawling on the camera lens, both of which were observed in the experiments. Without a method to differentiate targets from each other, it is difficult to automate recovery from swapping events. Therefore, a fully automated visual tracking system will either need to overcome the difficulty of differentiating between homogeneous targets, or augment the scene by including visible markers on the targets.

Figure 9:
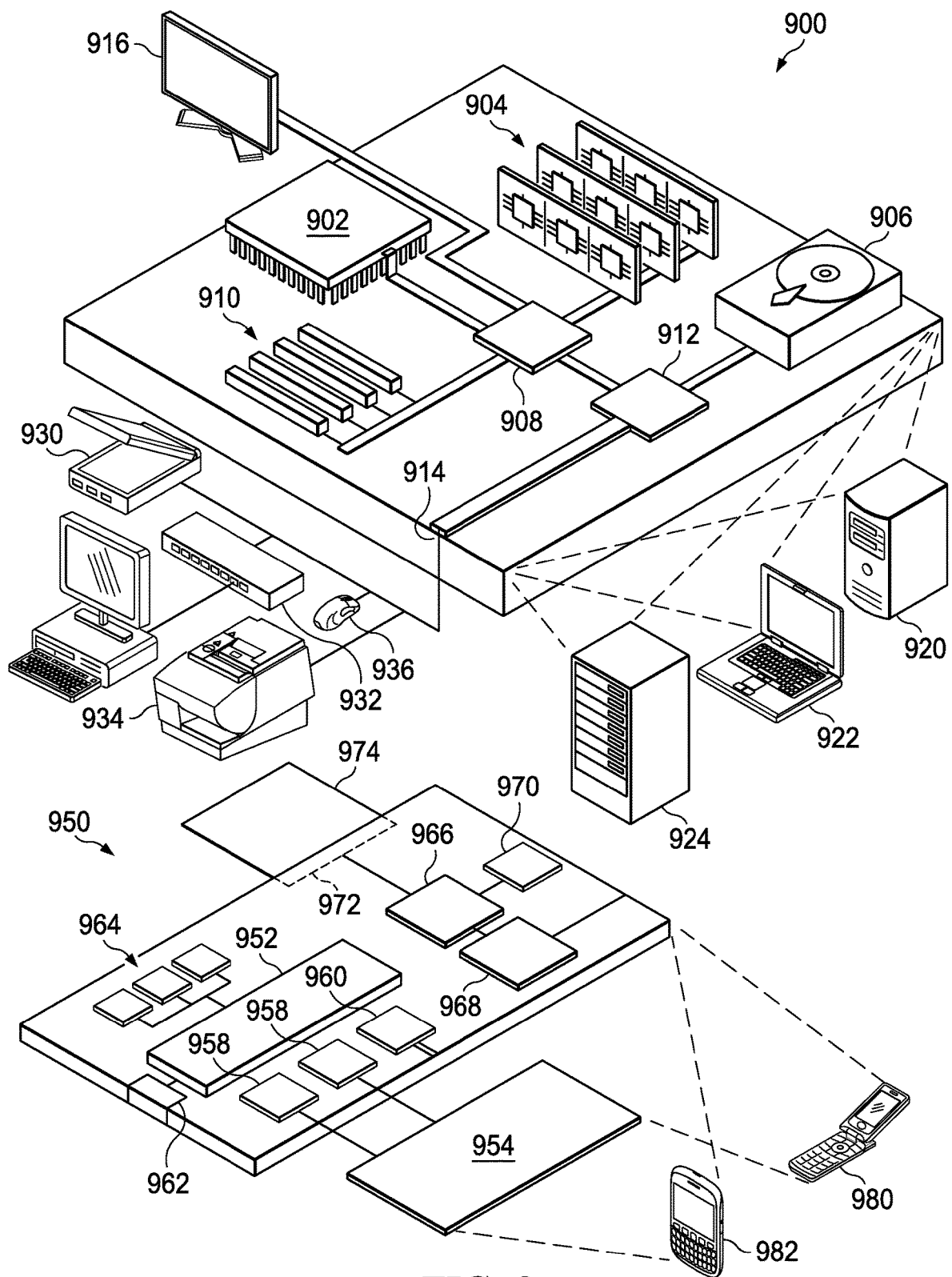
FIG. 9 shows an example of a computing device and a mobile computing device that can be used to implement the techniques described here.

FIG. 9 shows an example of a computing device 900 and a mobile computing device 950 that can be used to implement the techniques described here. The computing device 900 is intended to represent various forms of digital computers, such as laptops, desktops, workstations, personal digital assistants, servers, blade servers, mainframes, and other appropriate computers. The mobile computing device 950 is intended to represent various forms of mobile devices, such as personal digital assistants, cellular telephones, smart-phones, and other similar computing devices. Additionally, computing device 900 or 950 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer- or machine-readable mediums (for example, the memory 904, the storage device 906, or memory on the processor 902).

The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916 (e.g., through a graphics processor or accelerator), and to the high-speed expansion ports 910, which may accept various expansion cards. In the implementation, the low-speed interface 912 is coupled to the storage device 906 and the low-speed expansion port 914. The low-speed expansion port 914, which may include various communication ports (e.g., USB, Bluetooth, Ethernet, wireless Ethernet) may be coupled to one or more input/output devices. Such input/output devices may include a scanner 930, a printing device 934, or a keyboard or mouse 936. The input/output devices may also by coupled to the low-speed expansion port 914 through a network adapter. Such network input/output devices may include, for example, a switch or router 932.

The computing device 900 may be implemented in a number of different forms, as shown in FIG. 9. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device, such as a mobile computing device 950. Each of such devices may contain one or more of the computing device 900 and the mobile computing device 950, and an entire system may be made up of multiple computing devices communicating with each other.

The mobile computing device 950 includes a processor 952, a memory 964, an input/output device such as a display 954, a communication interface 966, and a transceiver 968, among other components. The mobile computing device 950 may also be provided with a storage device, such as a micro-drive or other device, to provide additional storage. Each of the processor 952, the memory 964, the display 954, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. For example, the processor 952 may be a Complex Instruction Set Computers (CISC) processor, a Reduced Instruction Set Computer (RISC) processor, or a Minimal Instruction Set Computer (MISC) processor. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a Thin-Film-Transistor Liquid Crystal Display (TFT) display or an Organic Light Emitting Diode (OLED) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a Single in Line Memory Module (SIMM) card interface. The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provided as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. that the instructions, when executed by one or more processing devices (for example, processor 952), perform one or more methods, such as those described above. The instructions can also be stored by one or more storage devices, such as one or more computer- or machine-readable mediums (for example, the memory 964, the expansion memory 974, or memory on the processor 952). In some implementations, the instructions can be received in a propagated signal, for example, over the transceiver 968 or the external interface 962.

The mobile computing device 950 may communicate wirelessly through the communication interface 966, which may include digital signal processing circuitry where necessary. The communication interface 966 may provide for communications under various modes or protocols, such as Global System for Mobile communications (GSM) voice calls, Short Message Service (SMS), Enhanced Messaging Service (EMS), or Multimedia Messaging Service (MMS) messaging, code division multiple access (CDMA), time division multiple access (TDMA), Personal Digital Cellular (PDC), Wideband Code Division Multiple Access (WCDMA), CDMA2000, or General Packet Radio Service (GPRS), among others. Such communication may occur, for example, through the transceiver 968 using a radio-frequency. In addition, short-range communication may occur, such as using a Bluetooth, Wi-Fi, or other such transceiver. In addition, a Global Positioning System (GPS) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone, personal digital assistant, or other similar mobile device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described multi-object tracking system. Accordingly, other implementations are within the scope of the following claims.

It is to be understood that, while the methods and compositions of matter have been described herein in conjunction with a number of different aspects, the foregoing description of the various aspects is intended to illustrate and not limit the scope of the methods and compositions of matter. Other aspects, advantages, and modifications are within the scope of the following claims.

Disclosed are methods and compositions that can be used for, can be used in conjunction with, can be used in preparation for, or are products of the disclosed methods and compositions. These and other materials are disclosed herein, and it is understood that combinations, subsets, interactions, groups, etc. of these methods and compositions are disclosed. That is, while specific reference to each various individual and collective combinations and permutations of these compositions and methods may not be explicitly disclosed, each is specifically contemplated and described herein. For example, if a particular composition of matter or a particular method is disclosed and discussed and a number of compositions or methods are discussed, each and every combination and permutation of the compositions and the methods are specifically contemplated unless specifically indicated to the contrary. Likewise, any subset or combination of these is also specifically contemplated and disclosed.

What is claimed is:

1. A computer-implemented method comprising:
receiving, from a motion sensing device, a plurality of image frames that includes information regarding a plurality of animals housed in a group-housed environment;
determining a coordinate space of the group-housed environment based on an analysis of a first image frame of the image frames;
generating, based on the analysis of the first image frame, an ellipsoid model for each animal based on defined surface points for each animal weighted according to a likely proximity to a crest of a spine of the respective animal, in which a first surface point that is more likely to be near the crest of the spine of the respective animal is given a higher weight than a second surface point that is less likely to be near the crest of the spine of the respective animal; and tracking a position and an orientation of each animal within the image frames by:
  enforcing shape consistency of the ellipsoid models; and
  adjusting the position of each of the ellipsoid models based on the defined surface points for each animal and a maximum likelihood formulation for each animal.

2. The method of claim 1, wherein the maximum likelihood formulation alternates between assigning maximum-likelihood clusters to the defined surface points for each animal via a metric that enforces an ellipsoidal distribution, and a recalculation of parameters of the maximum-likelihood clusters.

3. The method of claim 1, wherein tracking the position and the orientation of each animal includes a use of an adaptive formulation of an exponential smoothing tracker.

4. The method of claim 1, wherein determining the coordinate space of the group-housed environment is based on annotating corner points of the group-housed environment in the first image frame.

5. The method of claim 4, wherein annotating the corner points of the group-housed environment is performed via a user interface.

6. The method of claim 4, wherein the first image frame is further annotated to isolate points in a foreground of the first image from a background of the first image by removing points that lie outside bounds of the group-housed environment bounds and masking out points that lie in an image space of a feeder and a waterer.

7. The method of claim 1, wherein the position and the orientation of each animal is characterized by a centroid and rotation matrix applied to each respective ellipsoid model.

8. The method of claim 1, wherein adjusting the position of each of the ellipsoid models within each image frame is based on recalculating a centroid and an orientation of each respective ellipsoid model by weighting the respective surface points according to a likely proximity to the crest of the spine of the respective animal.

9. The method of claim 1, wherein the animals are pigs.

10. The method of claim 1, wherein the motion sensing device is a depth camera.

11. The method of claim 1, comprising providing the tracking the position and the orientation data to a livestock management system that tracks health, wellbeing, growth-rate, and aggression among the animals in the group-housed environment.

12. The method of claim 1 in which adjusting the position of each of the ellipsoid models comprises adjusting the position of each of the ellipsoid models based on the defined surface points for each animal and a maximum likelihood formulation of a movement distance for each animal.

13. One or more non-transitory computer-readable storage media coupled to one or more processors and having instructions stored thereon which, when executed by the one or more processors, cause the one or more processors to perform operations for tracking a plurality of animals, the operations comprising:
  receiving, from a motion sensing device, a plurality of image frames that includes information regarding the animals housed in a group-housed environment;
  determining a coordinate space of the group-housed environment based on an analysis of a first image frame of the image frames;
  generating, based on the analysis of the first image frame, an ellipsoid model for each animal based on defined surface points for each animal weighted according to a likely proximity to a crest of a spine of the respective animal, in which a first surface point that is more likely to be near the crest of the spine of the respective animal is given a higher weight than a second surface point that is less likely to be near the crest of the spine of the respective animal; and
  tracking a position and an orientation of each animal within the image frames by:
    enforcing shape consistency of the ellipsoid models; and
    adjusting the position of each of the ellipsoid models based on the defined surface points for each animal and a maximum likelihood formulation for each animal.

14. The non-transitory computer-readable storage media of claim 13, wherein the maximum likelihood formulation alternates between assigning maximum-likelihood clusters to the defined surface points for each animal via a metric that enforces an ellipsoidal distribution, and a recalculation of parameters of the maximum-likelihood clusters.

15. The non-transitory computer-readable storage media of claim 13, wherein tracking the position and the orientation of each animal includes a use of an adaptive formulation of an exponential smoothing tracker.

16. The non-transitory computer-readable storage media of claim 13, wherein determining the coordinate space of the group-housed environment is based on annotating corner points of the group-housed environment in the first image frame.

17. The non-transitory computer-readable storage media of claim 16, wherein the first image frame is further annotated to isolate points in a foreground of the first image from a background of the first image by removing points that lie outside bounds of the group-housed environment bounds and masking out points that lie in an image space of a feeder and a waterer.

18. The non-transitory computer-readable storage media of claim 13, wherein the position and the orientation of each animal is characterized by a centroid and rotation matrix applied to each respective ellipsoid model.

19. The non-transitory computer-readable storage media of claim 13, wherein adjusting the position of each of the ellipsoid models within each image frame is based on recalculating a centroid and an orientation of each respective ellipsoid model by weighting the respective surface points according to a likely proximity to the crest of the spine of the respective animal.

20. The non-transitory computer-readable storage media of claim 13, in which adjusting the position of each of the ellipsoid models comprises adjusting the position of each of the ellipsoid models based on the defined surface points for each animal and a maximum likelihood formulation of a movement distance for each animal.

21. A system, comprising:
  a motion sensing device;
  one or more processors; and
  a computer-readable storage device coupled to the one or more processors and having instructions stored thereon which, when executed by the one or more processors, cause the one or more processors to perform operations for tracking a plurality of animals in a group-housed environment, the operations comprising:

receiving, from the motion sensing device, a plurality of image frames that includes information regarding the animals housed in the group-housed environment;

determining a coordinate space of the group-housed environment based on an analysis of a first image frame of the image frames;

generating, based on the analysis of the first image frame, an ellipsoid model for each animal based on defined surface points for each animal weighted according to a likely proximity to a crest of a spine of the respective animal, in which a first surface point that is more likely to be near the crest of the spine of the respective animal is given a higher weight than a second surface point that is less likely to be near the crest of the spine of the respective animal; and tracking a position and an orientation of each animal within the image frames by:
  enforcing shape consistency of the ellipsoid models; and
  adjusting the position of each of the ellipsoid models based on the defined surface points for each animal, a maximum likelihood formulation for each animal.

22. The system of claim 21, wherein the position and the orientation of each animal is characterized by a centroid and rotation matrix applied to each respective ellipsoid model.

23. The system of claim 21 in which adjusting the position of each of the ellipsoid models comprises adjusting the position of each of the ellipsoid models based on the defined surface points for each animal and a maximum likelihood formulation of a movement distance for each animal.

24. The system of claim 21 in which the adjusting the position of each of the ellipsoid models comprises a recalculation of a centroid and an orientation of each respective ellipsoid model by weighting the respective surface points according to a likely proximity to the crest of the spine of the respective animal.

* * * * *